(No Model.)
A. FRESCHL.
BURIAL CASKET.
No. 278,929.  Patented June 5, 1883.
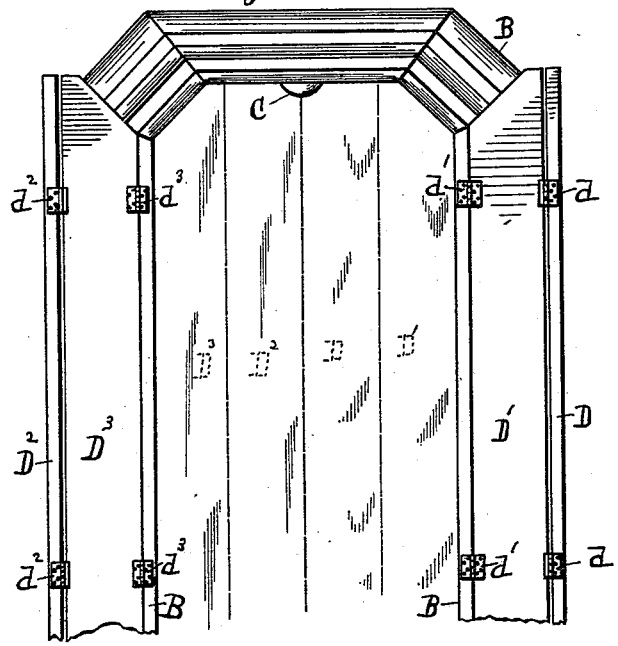
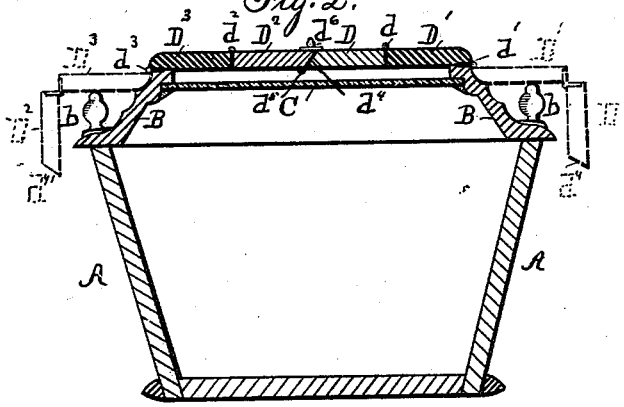
WITNESSES
Samuel E Thomas.
N. S. Wright.
INVENTOR
Alfred Freschl
By W. W. Leggett
Attorney

UNITED STATES PATENT OFFICE.

ALFRED FRESCHL, OF DETROIT, MICHIGAN.

BURIAL-CASKET.

SPECIFICATION forming part of Letters Patent No. 278,929, dated June 5, 1883.

Application filed January 9, 1883. (No model.)

*To all whom it may concern:*

Be it known that I, ALFRED FRESCHL, of Detroit, county of Wayne, State of Michigan, have invented a new and useful Improvement in Panels for Burial-Caskets; and I declare the following to be a full, clear, and exact description of the same, such as will enable others skilled in the art to which it pertains to make and use it, reference being had to the accompanying drawings, which form a part of this specification.

My invention consists in the combination of devices and appliances hereinafter specified, and more particularly pointed out in the claim.

In the drawings, Figure 1 is a plan view of a device embodying my invention. Fig. 2 is a vertical section of the same.

Referring to the drawings, A is the shell of any ordinary burial-casket. B is the molding in common use therewith, which molding is known in the trade as "cove," and will be so designated by me in referring to this part hereinafter. C is the sliding glass. D and D', $D^2$ and $D^3$ represent the leaves of a folding panel. The leaves D and D' are hinged together, as shown at $d$, and to the top of the cove, as shown at $d'$. The leaves $D^2$ and $D^3$ are similarly hinged together, as shown at $d^2$, and to the top of the cove, as shown at $d^3$. I prefer that the inner edges of the leaves D and $D^2$ should be suitably beveled, so that one may close upon the other, as shown at $d^4$, to aid in fastening the panel upon the casket when closed. When closed the leaves of the panel may be secured in any suitable man-man—as, for instance, with a catch or lock, $d^5$, and a knob $d^6$. Such a folding panel may be used with a casket of any shape, as the ordinary head-panel is simply made in four leaves hinged together longitudinally, and to the top of the cove on each side, as described.

I would have it understood that my invention contemplates and covers the construction of a panel the full length of the casket in the manner I have described, if desired. The panel may be so made of any suitable material.

It is evident that when the casket is opened by folding the leaves outward, as shown by the dotted lines in Fig. 2, the leaves D and $D^2$ may hang down over the upper edge of the shell, as indicated in the drawings; or the edges of said leaves may rest upon the edge of the cove. It is also apparent that when the leaves of the panel are opened, as shown by the dotted lines in Fig. 2, the surface of the leaves D' and $D^3$ forms a space for flowers or other ornamentation. These leaves may be suitably supported, so as to bear a proper weight, by resting upon the thumb-screws $b$. As thus constructed, both the under and upper surfaces of the leaves may be finished or trimmed in any desired manner, either by suitable polish, veneer, or cloth.

I am aware that a burial-casket has been provided with a lid composed of two longitudinal sections hinged, respectively, to opposite walls of the shell of the casket, each section inclining inwardly toward the top, so as to allow the sections, when open, to fall entirely below the top of the shell, with the angles of the sections resting against the side walls of the casket. In my invention I construct the top panel of two sets of hinged leaves, and when opened they do not fall entirely below the top of the shell, while a compact and convenient construction is secured, and, further, by providing two sets of hinged leaves, as described, they can be hinged directly to the upper edges of the shell itself, and the panels can thus be folded down, so that the two sections at each side hang in the same vertical plane, thus being entirely out of the way and permitting persons to closely approach the casket to view the remains.

What I claim is—

The combination, in a burial-casket, of a shell, A, provided with the cove B, with a folding top panel constructed of double leaves hinged longitudinally together and to the top of the cove at each side, whereby when the panel is opened the leaves hinged to the cove can rest horizontally over the cove, and the other leaves hang downward, substantially as described.

In testimony whereof I sign this specification in the presence of two witnesses.

ALFRED FRESCHL.

Witnesses:
N. S. WRIGHT,
SAMUEL E. THOMAS.